(12) United States Patent
Potter et al.

(10) Patent No.: US 7,970,783 B2
(45) Date of Patent: *Jun. 28, 2011

(54) DATABASE REPORT GENERATION

(75) Inventors: Charles Michael Potter, Osgoode (CA);
Henk Cazemier, Spencerville (CA);
Glen Michael Seeds, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/934,442

(22) Filed: Nov. 2, 2007

(65) Prior Publication Data

US 2008/0126326 A1    May 29, 2008

Related U.S. Application Data

(63) Continuation-in-part of application No. 10/835,244, filed on Apr. 29, 2004, now Pat. No. 7,293,008.

(30) Foreign Application Priority Data

Apr. 29, 2003   (CA) ..................................... 2427185

(51) Int. Cl.
*G06F 7/00* (2006.01)
*G06F 17/30* (2006.01)
(52) U.S. Cl. ...................................................... 707/760
(58) Field of Classification Search .................. 707/760
See application file for complete search history.

(56) References Cited

U.S. PATENT DOCUMENTS

| | | | |
|---|---|---|---|
| 4,454,576 A | 6/1984 | Adam et al. | |
| 5,611,076 A | 3/1997 | Durflinger et al. | |
| 5,893,125 A | 4/1999 | Shostak | |
| 5,903,859 A * | 5/1999 | Stone et al. | 704/8 |
| 6,003,036 A | 12/1999 | Martin | |
| 6,411,961 B1 | 6/2002 | Chen | |
| 6,581,068 B1 | 6/2003 | Bensoussan et al. | |
| 6,662,188 B1 | 12/2003 | Rasmussen et al. | |
| 6,738,762 B1 | 5/2004 | Chen et al. | |
| 6,802,059 B1 * | 10/2004 | Lyapustina et al. | 717/143 |
| 6,832,368 B1 * | 12/2004 | Zimowski | 717/139 |

(Continued)

FOREIGN PATENT DOCUMENTS

EP    0 413 486    2/1991

OTHER PUBLICATIONS

European Search Report for corresponding Application No. EP 04 01 0201, dated Nov. 18, 2004, 2 pages.

*Primary Examiner* — Mohammad Ali
*Assistant Examiner* — Patrick A Darno
(74) *Attorney, Agent, or Firm* — Shumaker & Sieffert, P.A.

(57) ABSTRACT

A system and method of producing a business report from data contained in a computer based business intelligence system, is provided. The method includes defining one or more macro functions, and producing a report layout containing one or more macrotized database language expressions. The macrotized database language expression having at least one of the macro functions. The method includes produce one or more valid database language expressions for a database query by modifying the one or more macrotized database language expressions in dependence upon the return value of the at least one of the macro functions, and applying the one or more valid database language expressions to one or more database to produce the business report.

18 Claims, 3 Drawing Sheets

U.S. PATENT DOCUMENTS

| | | |
|---|---|---|
| 6,847,962 B1 | 1/2005 | Cochrane et al. |
| 6,996,566 B1 | 2/2006 | George et al. |
| 6,999,977 B1 | 2/2006 | Norcott et al. |
| 7,139,755 B2 | 11/2006 | Hammond |
| 7,185,192 B1 | 2/2007 | Kahn |
| 7,571,431 B2 * | 8/2009 | Hampapuram et al. ...... 717/141 |
| 2003/0088558 A1 | 5/2003 | Zaharioudakis et al. |
| 2004/0015470 A1 | 1/2004 | Smith et al. |
| 2004/0015489 A1 | 1/2004 | Anonsen et al. |
| 2004/0039729 A1 | 2/2004 | Boger et al. |
| 2004/0139421 A1 * | 7/2004 | Hall ............................. 717/101 |
| 2004/0221262 A1 * | 11/2004 | Hampapuram et al. ...... 717/113 |
| 2004/0249810 A1 | 12/2004 | Das et al. |
| 2005/0004911 A1 | 1/2005 | Goldberg et al. |
| 2005/0240606 A1 | 10/2005 | Edelstein et al. |

* cited by examiner

DATABASE REPORT GENERATION

This application is a continuation-in-part of Ser. No. 10/835,244, filed on Apr. 29, 2004, which is incorporated herein by reference.

FIELD OF THE INVENTION

The invention relates to systems and methods of data warehousing and analysis, and in particular to a system and method for producing reports in a system suitable for business intelligence applications.

BACKGROUND

Authoring reports within a global enterprise context presents some interesting challenges. Reports are authored by a relatively small number of people for a large and varied audience. Authors are specialists in their problem domain, but not necessarily in the design of large databases (sometimes known as data warehouses) and their use. Nonetheless, in producing the reports, the authors must address factors such as:

- catering to readers who speak different languages and who may be in different locales (implying differing localized expectations of how data are displayed),
- reporting against different database instances, which have different data coverage, although they have the compatible structure,
- being able to create and test reports and their underlying metadata models in a development context, and
- deploying reports to a production environment.

Although currently available reporting products address these factors they have been found inadequate. In most cases, different versions of both models and reports must be created and deployed to handle these factors. For instance a large number of versions of reports in different languages is typically required, with manual (visual) checking to ensure that the results are similar across different domains.

What is needed is the ability to produce multiple versions of reports to ensure their consistency across language and locale, or to permit user selectable variations in the grouping of data, avoiding manual mechanisms where possible. The users (report authors) should not be aware of the factors at issue in the system design. Ideally the system would produce the numerous required reports with little or no extra effort, despite the complexity and magnitude of the underlying database.

SUMMARY OF THE INVENTION

The invention introduces a mechanism involving parameterization of the database metadata elements and their models. This permits the implementation of systems capable of handling a high degree of variability, without requiring separate reports or models. It further does away with the necessity to develop a number of large, complex report or model structures, one for each system or situation.

In one aspect, the invention provides for a method of producing a business report from data contained in a computer based business intelligence system using a report authoring tool, the method comprising the steps of producing a report layout containing one or more macrotized database language expressions, defining a parameter map having at least one key and one or more field names, accepting from a user one or more parameters and storing the parameters as input parameters, modifying the one or more macrotized database language expressions in dependence upon the one or more input parameters and the parameter map to produce one or more valid database language expressions containing at least one of the one or more field names, and applying the one or more valid database language expressions to the database to produce the business report.

In another aspect the method further provides a method wherein one key of the parameter map is a locale, the selecting of the locale based on user input; and combining the locale with the parameter map to further modify the one or more macrotized database language expressions.

In yet another aspect, the method provides for the modification of the macrotized database language expression by replacement of the partial expression delineated by the special characters with a partial expression built by accessing the parameter map with a lookup function.

In another aspect, the invention provides a method of producing a business report from data contained in a computer based business intelligence system. The method comprising the steps of defining one or more macro functions; producing a report layout containing one or more macrotized database language expressions, the macrotized database language expression having at least one of the macro functions; produce one or more valid database language expressions for a database query by modifying the one or more macrotized database language expressions in dependence upon the return value of the at least one of the macro functions; and applying the one or more valid database language expressions to one or more database to produce the business report.

BRIEF DESCRIPTION OF DRAWINGS

Embodiments of the invention are described with reference to the following drawings.

DETAILED DESCRIPTION OF EMBODIMENTS OF THE INVENTION

Figure 1:
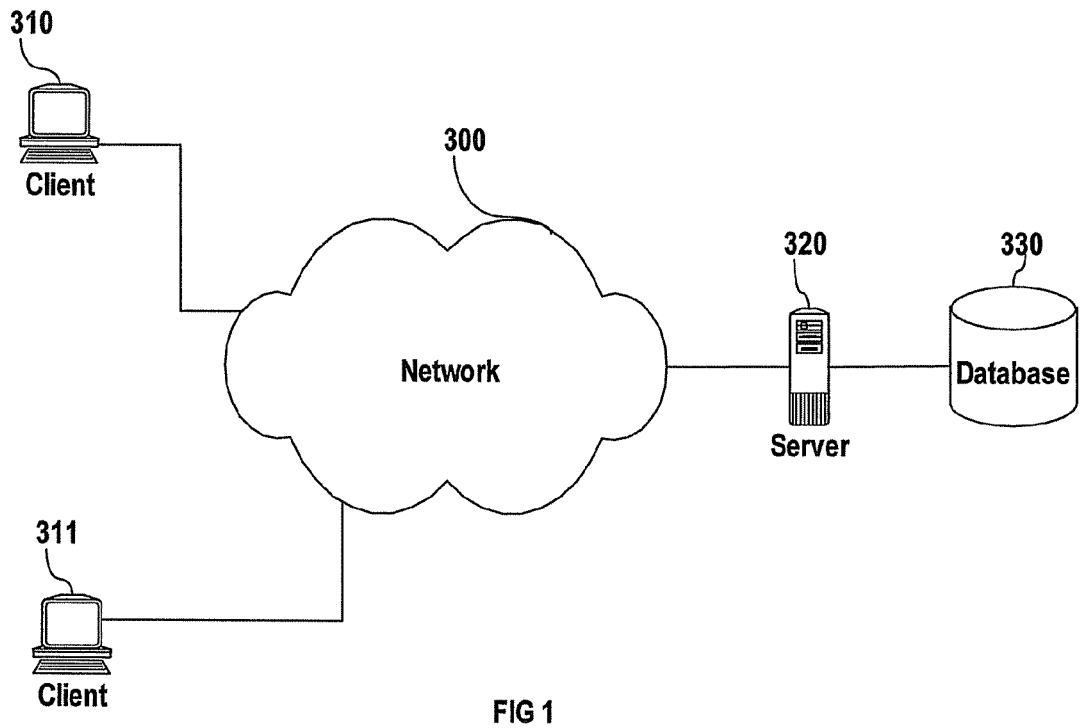
FIG. 1 shows a typical configuration in which embodiments of the invention may be deployed.

Embodiments of the invention are typically used in a general purpose client-server database system framework suitable for a business intelligence system. FIG. 1 shows a typical configuration in which such embodiments may be conveniently deployed. This configuration includes a network 400 that permits clients 410, 411 to communicate with a server 420 having a database or data warehouse 430 attached. Other configurations would be suitable, including those where the client and server functions are not separate, and those where more than one database is used, and those in which the databases are remote from the server and accessed over a network. In typical systems, a query engine is used to translate the users requirements into one or more database queries to retrieve information from a business intelligence database or data warehouse, and a metadata model is used to describe the database.

Figure 2:
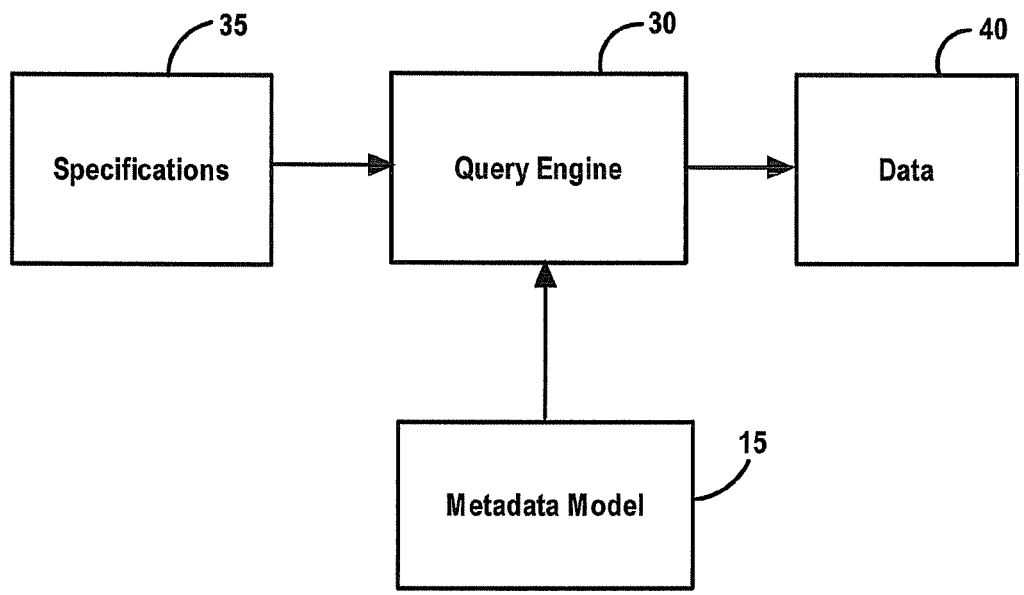
FIG. 2 is a schematic diagram showing an example of a query engine in which embodiments of the invention may be practised

The use of the metadata model 15 by the query engine 30 is briefly described with reference to FIG. 2. A user interacts with a business intelligent tool or client application (not shown) to generate a user's request for information. Upon the receipt of the user's request, the client application generates an initial specification 35 based on the request. The specification 35 may be ambiguous. Also, it may not be in a form that can be applied to the data sources directly. Using the information that is built in the metadata model 15, the query engine 30 makes the specification 35 unambiguous and builds a query in terms of the data access layer 102 for the specification 35. This intermediate formulation of the query is called a physical query and is subsequently translated into a data source specification language. The data source specification language is typically Structured Query Language (SQL), although other data source specification languages may be used. A query in a data source specification language can be executed on the data sources. Thus, the correct data 40 may be obtained. This process is explained in more detail in U.S. Pat. No. 6,609,123 "Query engine and method for querying data using metadata model"—Cazemier, et al., issued Aug. 19, 2003, hereby incorporated by reference.

Two forms of "macro" style text substitution are introduced into the database elements that are at the root of all objects in the metadata model on which all report authoring is based: session parameters, and parameter maps. These are expressed in a syntax that can be detected and acted on appropriately by the query generation engine.

In a typical example, the part of the SQL expression that describes the projection list for a database query is a parameter map lookup based on the language code selected at run time. This parameter map defines the relationship between the language codes and the columns that contain the required data for that language (for example, the name of an item in a sales catalog). At run time, the language code is mapped to the column name, which is substituted in the SQL expression. This allows a single report and model to handle many user languages, with little effort on the part of the modeler, and none on the part of the report designer.

In a second example, the model element that describes the connection to the database is a parameter map lookup based on a session variable that selects between test mode and production mode. This map defines the database connection for each mode. At run time, the mode is mapped to the database connection information, which is used to connect to the appropriate database. This allows a single report and model to handle both test and production mode, with little effort on the part of the modeler, and none on the part of the report designer.

Embodiments of the invention require the introduction of run-time parameters in the metadata describing the underlying database. In some embodiments, prompts are introduced to allow the user to select or introduce run-time parameters. These embodiments allow the selection of database elements that are to be driven from the run-time parameters using mapping rules in the model. In this way a single model or report can handle any variability that might be determined (or defined) using run-time or user-selected parameters. The variable factors include, but are not limited to, user-selected prompt responses, report language, database instance, and test environments. The parameters are incorporated into the model (encapsulated) during the model development phase. The report authors produce report templates suitable for a variety of audiences, for example where they all have a common theme. The report authors need know nothing about run-time parameters in producing report templates.

In embodiments of the invention, a number of forms of "macro" style text substitution are introduced into objects of the metadata model on which report authoring is based: in particular, session parameters, and parameter maps. These macro elements are expressed in a syntax that can be detected and acted upon appropriately by the query (generation) engine, which incorporates a macro-expanding pre-processor.

In the resultant syntax, the expressions, or rather partial expressions, to be substituted in the so-called "macrotized" SQL expressions are distinguished by special symbols bracketing the partial expressions. These symbols are carefully chosen to allow the pre-processor to unambiguously identify the partial expressions. In one embodiment, the chosen special symbols are "#". For example:

<expression_to_be_substituted>#.

Alternative special symbols may be used, providing they are compatible with the syntax of the database language. In other words, such symbols should not be part of the original database language nor should they be in its reserved symbol dictionary. In some embodiments, partial expressions may be nested, in which case it has been found convenient to introduce the inner levels of macro using one or more other special symbols. For convenience these symbols may also be required to be compatible with the database language syntax, although, with careful design of the parser within the pre-processor this may not be necessary. This nesting is also known as de-referencing and is useful in situations where a session-parameter may point to a parameter-map-entry and vice versa.

All embodiments of the invention given here are described in terms of SQL and relational databases using simple examples of situations where use of the invention is advantageous. However, it will be apparent to those appropriately skilled in the art that the invention is applicable to more complex environments, to databases other than relational ones, and to programming languages other than SQL.

In one example embodiment, the user is able to select a language code (say English, German, or French) at run time; that is, when an actual business report is generated. The selection of the language code allows the name of an item in a sales catalogue to be expressed in the chosen language, viz.: dishwasher, Spülmaschine or lave-vaisselle, respectively.

To achieve this result, that part of the SQL expression describing the projection list (or derived column list) for a database query results in a parameter map lookup based on a language code selected at run time. This parameter map defines the relationship between the language codes (designating for example English, German, or French) and the columns containing the required data for that language. Thus, the name of an item in a sales catalogue is expressed as a literal string in a particular language: "partname_en=dishwasher", "partname_de=Spülmaschine", "partname_fr=lave-vaisselle". At run time, the language code is mapped to the column name, which is then substituted in to the SQL statement before the query is run.

In this embodiment, string processing is performed on the macrotized SQL expressions using an SQL pre-processor. The resultant valid SQL expressions are then passed, via the main query engine function, to the database engine.

In this simple embodiment, the macrotized SQL expression as generated by the report author looks like this code fragment:

. . .

SELECT partno, partname#$locale# FROM Parts . . .

. . .

A table of locales provides a translation for the #$locale# string to substitute in the macrotized SQL expression to produce a valid expression.

The macrotized SQL expressions, and associated tables may be retained in a report outline for later use.

The particular entry used from this table is based on one of a number of parameters that are set for this environment/session, as described below. In this case, when the SQL pre-processor is invoked with locale="_en", the result is the following fragment of the SQL statement:

...
SELECT partno, partname_en FROM Parts . . .
...

The selection of the appropriate locale string is achieved using techniques such as indexing into the table of locales, the index value being that appropriate to the language chosen for the session, although other equivalent mechanisms may be used. In this way, other languages may be selected during execution of a report depending on the user's locale without the user being involved in manipulating the syntax of the database access language. However, this particular embodiment requires that each of the columns defined by part name #$locale# be constructed with a strict syntax, which provides scope for error.

Figure 3:
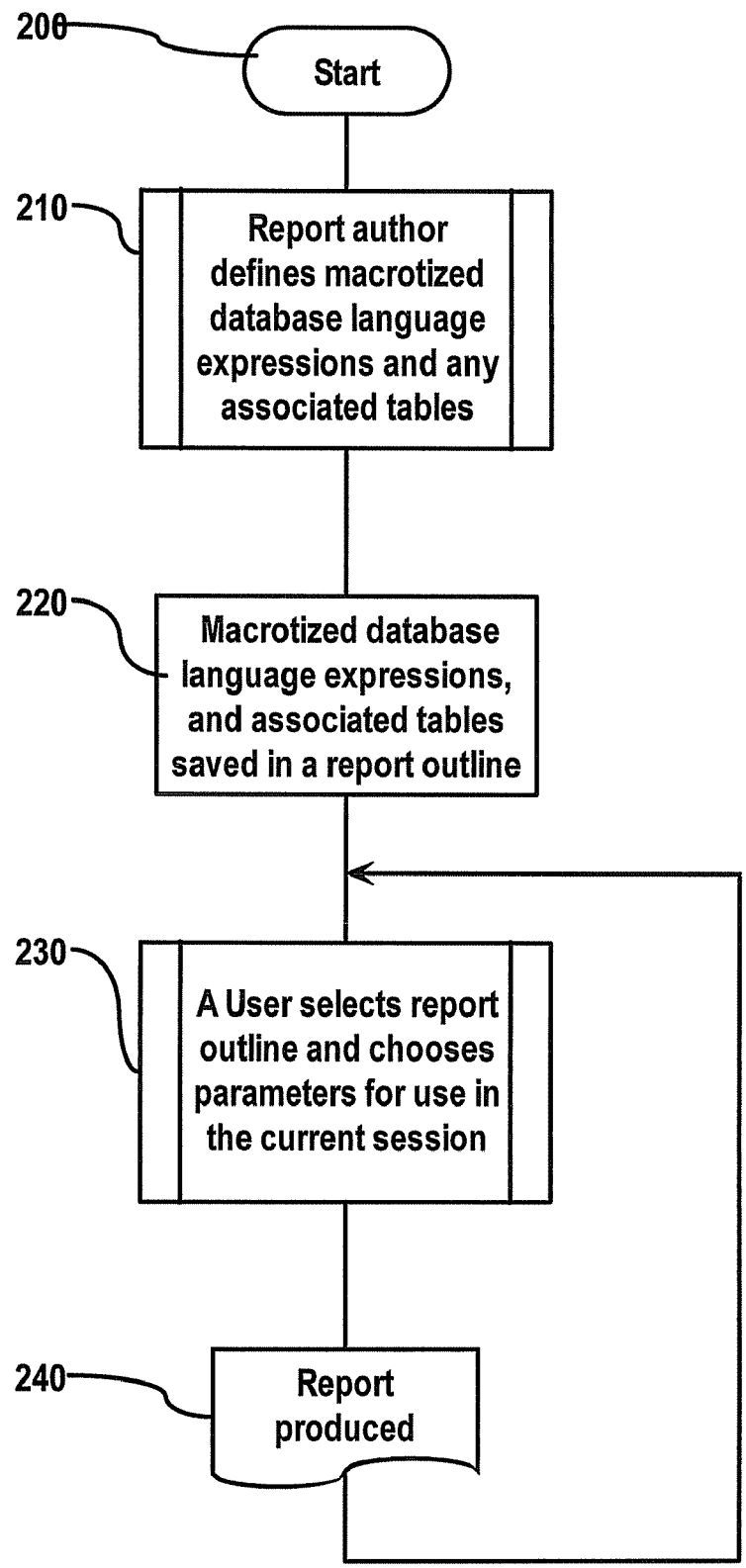
FIG. 3 is a flowchart of one embodiment of the invention.

The flowchart of FIG. 3 is next described. It generally describes embodiments of the invention. Each embodiment starts 200 and a report author generates the necessary macrotized expressions and tables 210. These are then stored for later use 220 by a user who provides parameters 230 required to generate the valid database expressions, and a report is produced 240. A user may repeat the operations in 220 and 230 to produce more than one report, and more than one user may use the results of the operations 210, 220 to produce customised reports.

In other embodiments, to overcome some of the restrictions of the earlier embodiment, the fragment of the macrotized SQL expression looks like:

...
SELECT partno, #$part_locale {$locale}# from Parts . . .
...

Figure 4:
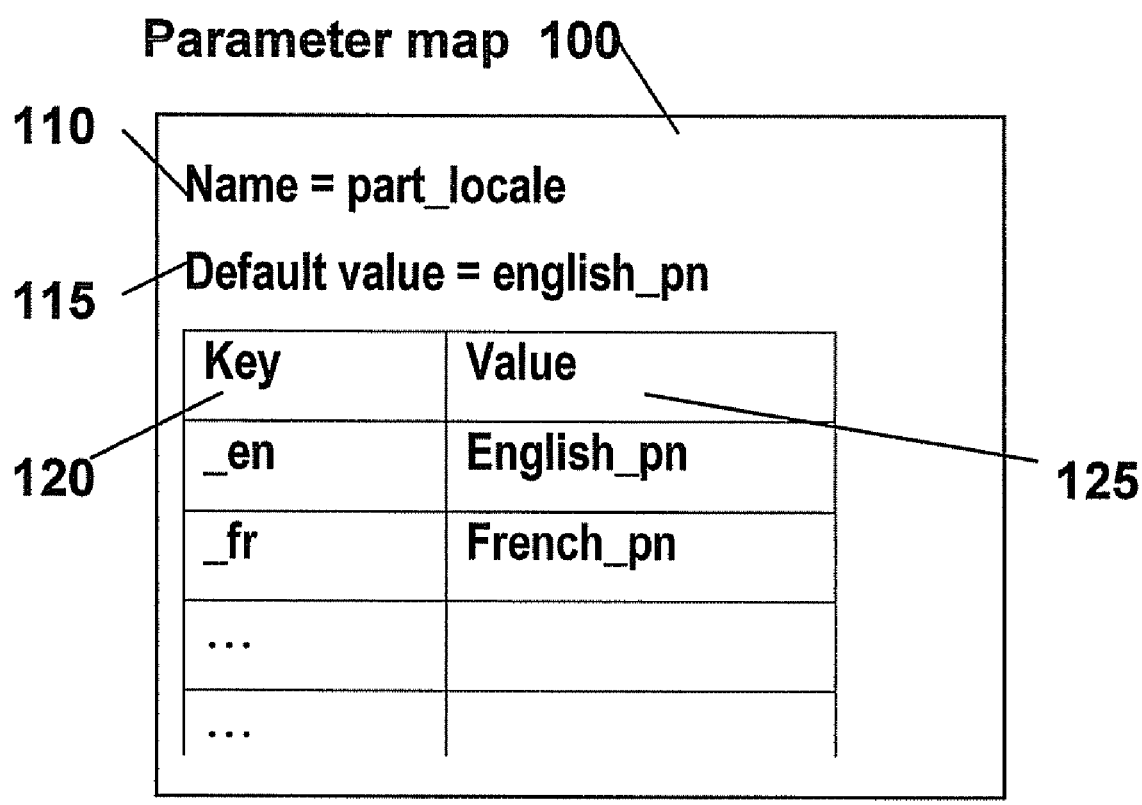
FIG. 4 shows an outline of a parameter map used in one embodiment of the invention.

Here, the table used to replace the #$part_locale {$locale}# partial expression contains the complete translation of the field name, keyed on the locale, thereby allowing more flexibility in the assignment of the field names. This is shown clearly in the FIG. 4 which shows an example of a parameter map 100, comprising a number of elements including its Name 110, and a two column table, the columns being the language Key 120, and the Value 125, in this case a reference or pointer to the part name translated into the applicable language (also referred to as a "field name"). The parameter map may also contain other information that is useful in other embodiments: in this example a Default value 115 for the reference or pointer to the translated part name. This value is selected and returned in some embodiments when the user opts not to choose a locale, or where a Key (or Value) has not (yet) been provided.

The parameter map function effectively introduces another level of 'indirection'. It has the advantage that the entire expression is defined within a single parameter map (or table). A session parameter, established for each session, is used to determine the appropriate entry (Key and Value) in the table. The resultant SQL expression is the same as the previous example:

...
SELECT partno, partname_en FROM Parts . . .
...

In all embodiments, the table or tables determined by the partial expression between the special symbols, e.g. #$part_locale {$locale}#, must contain syntactically correct partial expressions and field names for substitution into the SQL statements as required.

The above example embodiment of the invention allows a single report and model to handle many user languages.

In a further embodiment, the model element that describes the connection to the database is formed from a parameter map lookup based on a session variable that selects between test mode and production mode. This map defines the database connection for each mode. At run time, the mode is mapped to the database connection information, which is used to connect to the appropriate database.

For example the fragment of the macrotized SQL expression is:

...
SELECT partno, partname_en from #$part_source#
...

where $part_source is a session parameter that should contain the name of a table, which is then substituted during pre-processing. In these embodiments it is required that all of the alternative databases contained in the sources table be compatible.

In this example the method described allows report authors to produce a single report and model to handle both the test and production models. Subsequently, no effort is required on the part of the report users who rely on their locale to insulate them from the underlying substitutions and conversions.

In the following embodiment of the invention the user is prompted to supply more information than can be ascertained from the data already available.

The first code snippet is the definition of an element requiring user input.

```
gcol defined as:

$group_col{
prompt('gcolumn','token','1')
}

```

At run time, this results in the following snippet of code. Here the user must provide at least some of the information required.

```
report on
gcol ----> user prompted
product.productname
details.quantity
    group_col -->default: [qegosales].[PRODUCT].[PRODUCTNAME]
1 --> [qegosales].[COUNTRY].[COUNTRY]
2 -->[qegosales].[PRODUCTLINE].[PRODUCTLINE]
```

In further embodiments, the system provides default input if the user chooses not to provide any.

For convenience, the following sections describe some more interesting aspects of a Macro syntax used in one embodiment of the macro specification. In practice, many variations are possible. The macros are used to create runtime driven fragments of query code and provide a means to manipulate strings and string expressions.

Session Parameters (or Model Parameters)

$parameter_name Evaluates to the value of the specified session parameter or, if it is not defined, to an empty string.

| Examples: | $runLocale |
| | $account.defaultName |

Parameter Map Entries $map {<key expr>} Evaluates to a value from a list of entries of the specified map at the specified key, which may be specified using a macro string expression.

| Example: | $languages{ 'en-us' } |
| | $languages{ $runLocale } |

These fragments rely on the existence of a table like the following:

| languages | |
| --- | --- |
| Key | Value |
| en-us | English |
| fr | French |

In the second fragment, the parameter used is an assumed global variable, $runLocale, previously initialised appropriately.

Parameter Map

% map Evaluates to a reference to the specified map, not just a single entry.

Example: csvIdentityName(% mapRolesToKeys)

This provides all roles of the current user as a comma-separated list.

It makes reference to a table, like the following:

| mapRoles_to_Keys | |
| --- | --- |
| Key | Value |
| NA | NorthAmerica |
| EU | Europe |
| ... | ... |

Complex Functions

CSVIdentityName returns a comma separated values list of the identity information remapped through the specified table.

| syntax: | CSVIdentityName ( %map[,separator] ) |
| example: | regionColumn in ( #CSVIdentityName ( %region_for_identity,",")# ) |

In use this might result in:

| regionColumn in ('North America' , 'Europe' ) | application: to build partial in-clauses, to filter data based on the identity name of the current user.

Integration

The Macros defined in embodiments of the invention provide partial expressions that can be used directly within database languages expressions, or within related Filters and Calculations.

Some functions take in a whole parameter map as an argument. This is expressed using the '%' character instead of the '$' character to precede the name of the map For example:

| #in_clause_builder ( | |
| "'", | // start quote for each element |
| "'", | // end quote for each element |
| " , ", | // separator between elements |
| %mymap) | // the map to get the entries from |
| # | |

As with many macro languages, additional control structures such as if-then-else, for-loop and do-while-loop, can be added, as well as array structures. Users (designers) are able to define and provide additional functions, which can also be extended to be more than a single statement.

Macro Functions

Macro functions with the macroitzed database expressions are described in detail. The macrotized database expressions described above may use one or more macro functions or a combination of the parameter maps and the macro functions. The return value of the function or a user-entered value in response to a prompt, can be defined in a macrotized expression using the prompt macro function. User input can be provided to all macro expressions. Instead of directly accepting input from the user to select an entry from the parameter map, the selection can be based on the evaluation of the function, which extracts information from the user/report/system/environment.

The following list contains functions that are used within a macro. A macro may contain one or more macro functions. A macro is delimited by a number sign (#) at the beginning and at the end. Everything between the number signs is treated as a macro expression, which is executed at run time.

1) +

"+" concatenates two strings.
Syntax
    value1 + value2
Example
    #'{' + $runLocale + '}'#
    Result: {en-us}

2) array

"array" constructs an array out of the list of parameters.
Syntax
    array ( string_exp | array_exp { , string_exp | array_exp } )
Example
    #csv ( 'x1' , 'x2' , array ( 'a1' , 'a2' ) )#
    Result: 'x1' , 'x2' , 'a1' , 'a2'

3) csv

"csv" constructs a comma separated values string from the elements of the array. Optionally the separator and quote strings can be specified. The default separator is a comma (,) and the default quote character is a single quote (').

```
Syntax
    csv ( array_exp [ , separator_string [ , quote_string ] ] )
Example
    #csv ( array ( 'a1', 'a2' ) )#
    Result: 'a1', 'a2'
```

4) dq

"dq" surrounds the passed string with double quotes.

```
Syntax
    dq ( string_exp )
Example
    #dq ( 'zero' )#
    Result: 'zero'
```

5) grep

"grep" searches for elements of an array that match the pattern specified in the first argument. It returns an array with the elements that pass the pattern.

```
Syntax
    grep ( pattern_string , array_exp )
Example
    #csv ( grep ( 's' , array ( 'as', 'an', 'arts' ) ) )#
    Result: 'as', 'arts'
```

6) join

"join" joins the elements of an array using the separator string.

```
Syntax
    join ( separator_string , array_exp )
Example
    # sq ( join ( '||' , array ( 'as', 'an', 'arts' ) ) )#
    Result: 'as||an||arts'
```

7) prompt

"prompt" prompt the user for a single value. Only the prompt name argument is required.

```
Syntax
    prompt ( prompt_name , datatype , defaultText ,
    text , queryItem , trailing_text )
Example
    select . . . where
        COUNTRY_MULTILINGUAL.COUNTRY_CODE >
        #prompt('Starting CountryCode',
            'integer',
            '10'
        )#
    Result: select . . . where
        COUNTRY_MULTILINGUAL.COUNTRY_CODE > 150
```

8) promptmany

"promptmany" prompts the user for one or more values. Only the prompt name argument is required.

```
Syntax
    promptmany ( prompt_name , datatype , defaultText ,
    text , queryItem , trailing_text )
```

```
Example
    select . . . where
        COUNTRY_MULTILINGUAL.COUNTRY IN ( #promptmany (
        'CountryName' ) # )
    Result: select . . . where
        COUNTRY_MULTILINGUAL.COUNTRY_CODE IN
        ('Canada' , 'The Netherlands' , 'Russia')
```

9) sb

"sb" surrounds the passed string with square brackets.

```
Syntax
    sb ( string_exp )
Example
    #sb ( 'abc' )#
    Result: [abc]
```

10) sq

"sq" surrounds the passed string with single quotes.

```
Syntax
    sq ( string_exp )
Example
    #sq ( 'zero' )#
    Result: 'zero'
```

11) sort

"sort" sorts the elements of the array in alphabetical order. Duplicates are retained.

```
Syntax
    sort ( array_exp )
Example
    #csv ( sort ( array ( 's3', 'a', 'x' ) ) )#
    Result: 'a', 's3', 'x'
```

12) split

"split" splits a string or the string elements of the array into separate elements.

```
Syntax
    split ( pattern_string, string_exp | array_exp )
Example 1
    #csv ( split ( '::', 'ab=c::de=f::gh=i' ) )#
    Result: 'ab=c' , 'de=f' , 'gh=i'
Example 2
    #csv ( split ( '=', split ( '::', 'ab=c::de=f::gh=i' ) ) )#
    Result: 'ab' , 'c' , 'de' , 'f' , 'gh' , 'i'
```

13) substitute

"substitute" searches for a pattern in a string or in the string elements of an array and substitute the found text with other text.

```
Syntax
    substitute ( pattern_string, replacement_string, string_exp |
    array_exp )
Example 1
    #sq ( substitute ( '^cn=', '***', 'cn=help' ) )#
    Result: '***help'
Example 2
    #csv ( substitute ( '^cn=', '***', array ( 'cn=help',
    'acn=5' ) ) )#
    Result: '***help' , 'acn=5'
```

-continued

Example 3
    #csv ( substitute ( 'cn=', ', array ( 'cn=help',
    'acn=5' ) ) )#
    Result: 'help', 'a5'

14) unique

"unique" removes duplicate entries from the array. The order of the elements is retained.

Syntax
    unique ( array_exp )
Example
    #csv ( unique ( array ( 's3', 'a', 's3', 'x' ) ) )#
    Result: 's3', 'a', 'x'

15) urlencode

"urlencode" encodes the passed argument. It is useful when specifying XML connection strings.

Syntax
    field_one=urlencode(prompt('userValue'))
Example
    urlencode(prompt('some_val'))
    Result: %27testValue%27

16) CSVIdentityName

"CSVIdentify Name" uses the identity information of the current authenticated user to lookup values in the specified parameter map. Each individual piece of the user's identity (account name, group names, role names) is used as a key into the map. The unique list of values that is retrieved from the map is then returned as a string, where each value is surrounded by single quotes and where multiple values are separated by commas.

Syntax
    CSVIdentityName ( %parameter_map_name [ , separator_string ] )
Example
    #CSVIdentityName ( %security_clearance_level_map )#
    Result: 'level_500', 'level_501', 'level_700'

17) CSVIdentityNameList

"CSVIdentityNameList" returns the pieces of the user's identity (account name, group names, role names) as a list of strings. The unique list of values is returned as a string, where each value is surrounded by single quotes and where multiple values are separated by commas.

Syntax
    CSVIdentityNameList ( [ separator_string ] )
Example
    #CSVIdentityNameList ( )#
    Result: 'Everyone', 'Report Administrators', 'Query User'

18) CAMPassport

"CAMPassport" returns the passport.

Syntax
    CAMPassport ( )
Example
    #CAMPassport ( )#
    Result: 111:98812d62-4fd4-037b-4354-26414cf7ebef:3677162321

19) CAMIDList

"CAMIDList" returns the pieces of the user's identity (account name, group names, role names) as a list of values separated by commas.

Syntax
    CAMIDList ( [ separator_string ] )
Example
    #CAMIDList ( )#
    Result: CAMID(':::Everyone'), CAMID(':Authors'),
    CAMID(':Query Users'),
    CAMID(':Consumers'), CAMID(':Metrics Authors')

20) CAMIDListForType

"CAMIDListForType" returns an array of the user's identities based on the identity type (account, group, or role). It can be used with the macro functions csv or join.

Syntax
    CAMIDListForType ( identity type )
Example
    [qs].[userRole] IN ( #csv ( CAMIDListForType ( 'role' ) ) # )
    Result: [qs].[userRole] IN ( 'Administrator', 'developer' )

As described above, the database may be, but not limited to, relational databases, OLAP databases. The macrotized database language may be MDX in order to access data stored in OLAP databases.

The parameter map may be defined in a metadata model, with users entering the values either manually or by executing a query that returns the key, value pairs, which are then stored in the model. In addition a parameter map may be defined based on a query that is executed when the parameter map is referenced via a macrotized expression at runtime. The model may be used by the report and access the content of the parameter map by using the macrotized expression.

One or more currently preferred embodiments have been described above by way of example. It will be apparent to persons skilled in the art that a number of variations and modifications can be made without departing from the scope of the invention as defined in the claims.

What is claimed is:

1. A method of producing a business report from data contained in a computer based business intelligence system, the method comprising:
    defining one or more macro functions to prompt for user inputs and accept the user inputs during execution of the one or more macro functions;
    producing a report layout containing one or more macrotized database language expressions, the one or more macrotized database language expressions having at least one of the macro functions and one or more partial expressions;
    producing, by a computer, one or more valid database language expressions for a database query by at least modifying the one or more macrotized database language expressions of the report layout, wherein the one or more macrotized database language expressions are modified upon a return value of the at least one of the macro functions, and wherein the return value of the at least one of the macros functions includes at least one of the user inputs accepted during execution of the one or more macro functions; and applying the one or more valid database language expressions to one or more databases to produce the business report, wherein the business report is based on the report layout.

2. The method of claim 1, further comprising:
defining a parameter map having one or more keys and one or more field names, the one or more keys being associated with the one or more field names;
the at least one of the macro functions being associated with the parameter map.

3. The method of claim 2, wherein producing the report layout comprises:
selecting an entry from the parameter map based on the evaluation of the at least one of the macro functions.

4. The method of claim 1, wherein applying comprises:
retrieving the data from the one or more databases based on the one or more valid database language expressions.

5. The method of claim 1, further comprising:
generating a string based on the at least one of the user inputs accepted during execution of the one or more macro functions, wherein the one or more macrotized database language expressions are modified based upon the return value of the at least one of the macro functions by at least substituting a partial expression included within the one or more macrotized database language expressions with the generated string to produce the one or more valid database language expressions for the database query.

6. The method of claim 1, wherein the user inputs include at least one of a set of user-selected prompt responses, an indication or a language in which to produce a business report, and database connection information.

7. A computer-readable storage medium encoded with instructions for causing one or more programmable processors to:
define one or more macro functions to prompt for user inputs and accept the user inputs during execution of the one or more macro functions;
produce a report layout containing one or more macrotized database language expressions, the one or more macrotized database language expressions having at least one of the macro functions;
produce one or more valid database language expressions for a database query by at least modifying the one or more macrotized database language expressions of the report layout, wherein the one or more macrotized database language expressions are modified based upon a return value of the at least one of the macro functions, and wherein the return value of the at least one of the macro functions includes at least one of the user inputs accepted during execution of the one or more macro functions; and
apply the one or more valid database language expressions to one or more databases to produce the business report, wherein the business report is based on the report layout.

8. The computer-readable storage medium of claim 7, further encoded with instructions that cause the one or more programmable processors to:
define a parameter map having one or more keys and one or more field names, the one or more keys being associated with the one or more field names;
the at least one of the macro functions being associated with the parameter map.

9. The computer-readable storage medium of claim 8, further encoded with instructions that cause the one or more programmable processors to:
select an entry from the parameter map based on the evaluation of the at least one of the macro functions.

10. The computer-readable storage medium of claim 7, further encoded with instructions that cause the one or more programmable processors to:
retrieve the data from the one or more databases based on the one or more valid database language expressions.

11. The computer-readable storage medium of claim 7, further encoded with instructions that cause the one or more programmable processors to:
generate a string based on the at least one of the user inputs accepted during execution of the one or more macro functions, wherein the one or more macrotized database language expressions are modified based upon the return value of the at least one of the macro functions by at least substituting a partial expression included within the one or more macrotized database language expressions with the generated string to produce the one or more valid database language expressions for the database query.

12. The computer-readable storage medium of claim 7, wherein the user inputs include at least one of a set of user-selected prompt responses, an indication of a language in which to produce a business report, and database connection information.

13. A business intelligence system comprising:
a computer;
one or more data sources configured to store business intelligence data;
a metadata model configured to store model objects, wherein the model objects represent the data sources, and wherein the model objects include macrotized database language expressions, the macrotized database language expressions having a set of macro functions, wherein the at least one macro function is defined to prompt for user inputs and accept the user inputs during execution of the one or more macro functions; and
a query engine executable on the computer, wherein the query engine is configured to translate the macrotized database language expressions into a set of valid database language expressions based on a return value of at least a first macro function of the set of macro functions, wherein the return value of the at least one of the macro functions includes at least one of the user inputs accepted during execution of the one or more macro functions.

14. The business intelligence system of claim 13, wherein the metadata model is further configured to store a parameter map having one or more keys and one or more field names, the one or more keys being associated with the one or more field names, and the at least one of the macro functions being associated with the parameter map.

15. The business intelligence system of claim 14, wherein the query engine is further configured to select an entry from the parameter map based on the evaluation of the at least one of the macro functions.

16. The business intelligence system of claim 13, wherein the query engine is further configured to retrieve the data from the one or more data sources based on the one or more valid database language expressions.

17. The business intelligence system of claim 13, wherein the query engine is further configured to generate a string based on the at least one of the user inputs accepted during execution of the one or more macro functions, and wherein the one or more macrotized database language expressions are modified based upon the return value of the at least one of the macro functions by at least substituting a partial expression included within the one or more macrotized database language expressions with the generated string to produce the one or more valid database language expressions for the database query.

18. The business intelligence system of claim 13, wherein the user inputs include at least one of a set of user-selected prompt responses, an indication of a language in which to produce a business report, and database connection information.

* * * * *